CUSHIONED PACKAGE

Filed April 10, 1962 2 Sheets-Sheet 1

INVENTOR.
JAMES T. KANE
HARRY W. DAYTON
JAMES H. ALLISON
BY
Edward Halle
ATTORNEY May 4, 1965 J. T. KANE ET AL 3,181,766

CUSHIONED PACKAGE

Filed April 10, 1962 2 Sheets-Sheet 2

INVENTOR.
JAMES T. KANE
HARRY W. DAYTON
JAMES H. ALLISON
BY
Edward Halle
ATTORNEY

United States Patent Office 3,181,766
Patented May 4, 1965

3,181,766
CUSHIONED PACKAGE

James T. Kane, 121 Wright Road, Rockville Centre, N.Y.; Harry W. Dayton, 184 Bay Drive, Massapequa, N.Y.; and James H. Allison, 18 Lark Lane, East Northport, N.Y.

Filed Apr. 10, 1962, Ser. No. 186,391
9 Claims. (Cl. 229—14)

This invention relates to a new type of package for which the components may be provided in collapsed form and easily folded to form a package container for securely holding delicate objects of various shapes and sizes.

It is recognized that in certain industries in which delicate objects and materials are handled, such as the electronics industry, for example, the problem of proper packaging for shipment of devices and components is of paramount importance. Various types of packages of different sizes and shapes have been developed for specifically packing particular types of devices, components or instruments. Thus, a company handling large numbers of particular standardized devices will have on hand a supply of proper packages to ship these components by truck, plane, train, vessel or through common carriers or the mails, or the like. However, a definite problem exists in the case of a company or installation, such as a depot, supply warehouse or other facility, where delicate devices of different types may be on hand, and there may be a call for infrequent shipment of a particular device, or such particular devices may not be stored in sufficient quantity to warrant storage of specially sized shipping containers.

It is, therefore, an object of this invention to provide a package made of standardized components which may be used to package delicate objects having a plurality of different shapes and a plurality of different sizes.

It is a further object of this invention to provide a package made of standardized components which is easy to pack and assemble, and it is also an object of this invention to provide such a package having strength and durability as well as maximum protective means for the delicate material to be packed therein.

Still another object of this invention is to provide a minimum of different sized package components and means to create packages for an infinite number of different sizes and shapes of objects to be packed.

Further advantages and objects of this invention will appear in the specification hereinbelow. These objects and advantages are achieved with the package made of the components as illustrated in preferred forms in the accompanying drawings in which.

Similar numerals refer to similar parts throughout the several views.

Figure 1:
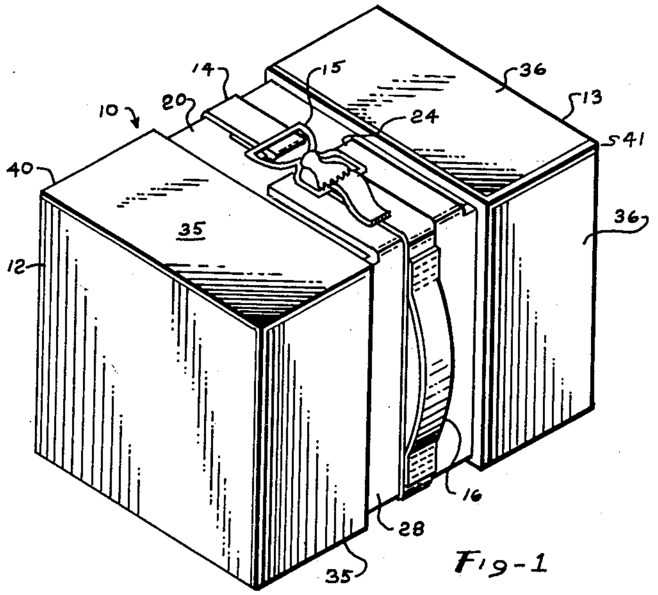
FIG. 1 is a perspective view of a completed package.

The package 10 comprises a folding body portion 11 and a pair of end covers 12 and 13. A binding or wrapping strap 14 is provided which may be fastened around the folding body portion 11 by means of a quick release buckle 15. The wrapping strap 14 also has an extra width of strap sewn thereon to provide a carrying handle 16.

Figure 2:
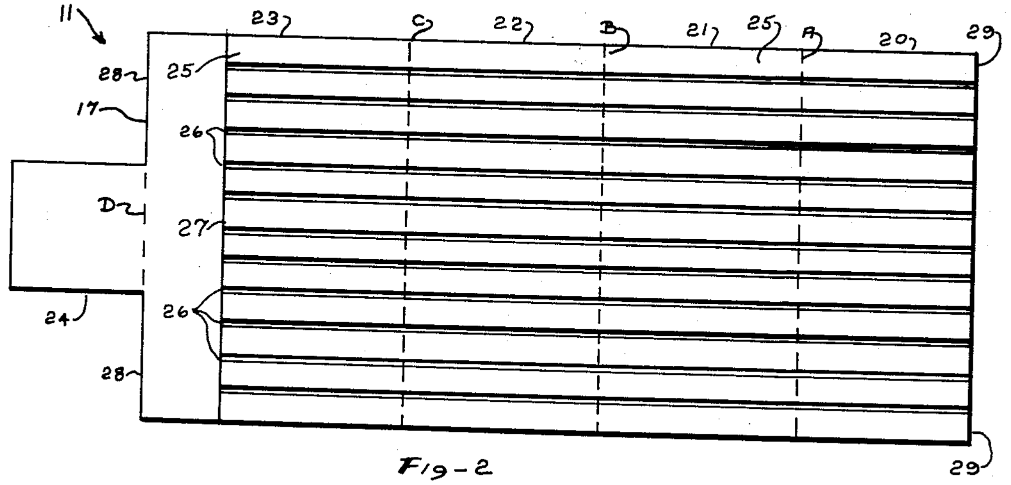
FIG. 2 is a top plan view of the folding body of the package in unfolded position.
Figure 3:
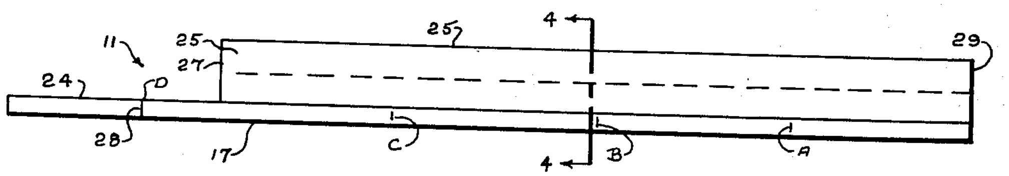
FIG. 3 is a side elevation of the view of FIG. 2.
Figure 4:
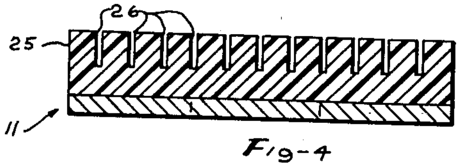
FIG. 4 is a cross sectional view taken along the lines 4—4 in FIG. 3.

The folding body portion 11 may be made of a blank 17 made of board, paperboard or other suitable material which may be scored for easy folding. The scoring is made at positions A, B, C and D so that the blank 17 can be folded into a four walled body having a front side wall 20, a bottom wall 21, a rear wall 22, a top wall 23 and a front flap 24. The blank 17 is made as shown in FIG. 2 of the drawings, with the front flap portion 24 somewhat reduced in width from the overall width of the balnk 17.

The blank 17 is preferably made of a strong body such as a triple wallboard which will stand a 1,100 pound test, and is water resistant. An example of this type of board is "Tri-Wall" manufactured by Tri-Wall Containers, Inc. of 799 Washington Street, New York, N.Y. While the type of wall mentioned is preferred for strength in the body portion, lighter board, as well as non-water resistant board, or any other suitable material may be used.

The folding body portion 11 also comprises at least one layer of deformable or resilient material such as the protective layer 25. The protective layer 25 is secured to the blank 17 preferably by means of a good adhesive such as Poly Bond PA–60–R2 which may be obtained from Polymer Industries, Inc. of Springdale, Connecticut. It may, however, be fastened by means of any good glue or adhesive, or fastening hooks, or any other means of fastening two layers together. This protective layer 25 may be made of any fairly durable deformable or resilient material such as foam rubber or polyurethane or equivalent. The preferred material is an open celled foamed polyurethane having a compression resistance of approximately 30 pounds per square foot at 25% deflection. Such a material may be obtained from General Foam Corporation of 640 West 134th Street, New York, N.Y. under the designation GF–30, and an equivalent material of somewhat softer density may also be obtained from the said corporation under the designation GF–24. We prefer to use such a material which is 2" thick. However, with a material of softer density, we may use it in a layer 3" thick as this will make the material somewhat more versatile for packing objects of irregular shapes.

The protective material should have excellent shock absorbing characteristics, good cushioning factor, good compression resistance, should have a useful temperature range of 0 to 150° F., excellent damping qualities and absence of dusting. The material should also have excellent fungus resistance characteristics and have negligible reaction to moisture effects. However, any other deformable or resilient type of compressible material which will serve the purpose of the invention may be used.

The resilient or deformable layer of protective material 25 is provided with gripping means such as a plurality of cuts or grooves 26. These cuts have a dual purpose. First, they permit easier bending and folding of the material to aid in the construction or setting up of the box or package 10, and secondly, they provide gripping means to hold an object within the package in much the same manner as the cuts or treads in an automobile tire provide gripping means for a wheel against a road surface.

Figure 5:
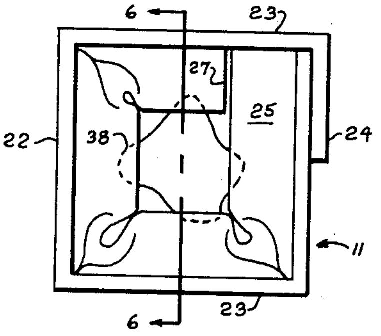
FIG. 5 is an end elevation of the device as seen from the arrows 5—5 in FIG. 1, with an end cover removed and an item enclosed therein.
Figure 6:
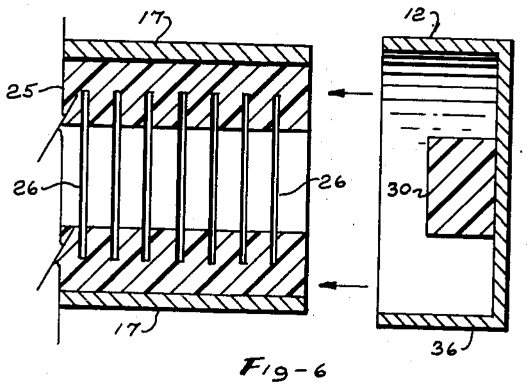
FIG. 6 is a cross section along the lines 6—6 in FIG. 5.
Figure 7:
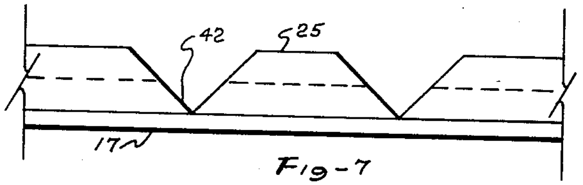
FIG. 7 is a detail of a side elevation similar to FIG. 3 showing an alternate form in which there are V-cuts in the protective material associated with the scoring means for folding the body material.

The size and thickness of the deformable protective layer 25 is related to the size of the blank 17 to provide for a good fit when folded. Reference to FIG. 5 of the drawings will show that the interior space in the completed package will depend on the thickness of the protective layer 25, and also that the position of end 27 on the blank 17 should be a distance from blank shoulder 28 equal to the thickness of protective layer 25. A package which is adaptable to pack many different types of items may be made by using a blank 17 12″ in width and 30″ from shoulder 28 to end 29. Tab 24 may be 5″ long and 4″ wide. Protective layer 25 should also be 12″ wide to correspond with the width of the blank and 27½″ long. This would leave a free distance on the blank of 2½″ between end 27 of protective layer 25 and shoulder 28 of blank 17.

If the triple board specified hereinabove is used, the blank 17 should be ½″ wide. Thus, the thickness of the protective layer 25 and the blank 17 of 2½″ will fit within the blank space between end 27 and shoulder 28 when the folding body portion 11 is in folded position. This will provide a package 10 having sides 8″ wide with an interior dimension between the folded protective layer 25 of 3″ square in cross section area. End covers 12 and 13 are provided with blocks 30 of protective material similar to the protective layer 25. These end blocks are 2″ in depth and 3″ square. Thus, the interior measurements of such a package would be 8″ long by 3″ square with a protective coating of 2″ all around. In a package of the character described where the protective coating 25 is 2″ thick, we provide for the cuts 26 to be 1″ deep and ⅛ of an inch wide. The dimensions given are, of course, preferred dimensions and may be varied within a great range without departing from the spirit and scope of the invention.

A package having the dimensions given hereinabove may thus be used to pack any delicate object such as a small one having at least one side of a dimension of at least 3″ long up to a larger one having outside dimensions slightly greater than 8″ x 3″ x 3″.

It is also apparent that any object within these size ranges may be packed within the container regardless of the shape of the object and without any other special packing preparations other than assembling the container around the object.

The dimensions given above will provide a container having outside dimensions of 8″ x 8″ x 12″. These dimensions are, of course, not critical to the invention, but are provided to make a container of a suitable size to pack smaller objects. Dimensions can be varied to make a second standardized size having outside dimensions of 10″ x 10″ x 14″, and a third standardized size having outside dimensions of 12″ x 12″ x 16″. Thus, blanks of suitable size and covers of suitable size can be provided to make three standardized packages in which it is possible to provide packing for thousands of items of various shapes ranging in size from minute to large. Of course, since this package is designed for manual wrapping by human beings, there would be limits to the outside maximum dimensions which would be practical. However, standardized sizes of any size could be made within the limits of human handling.

The package 10 is completed by closing both ends with the end covers 12 and 13 having blocks 30 centrally located thereon. End covers 12 and 13 may be made of board of single thickness or heavier, as desired, out of suitable blanks which may be folded and fashioned into rectangular covers or square covers, such as the covers 12 and 13, having sides all around such as sides 35 and 36. The size of end covers 12 and 13 should be designed so that the inside dimension between the sides 35 or the sides 36, as the case may be, would be relatively the same as the outside dimension of folded walls 20, 21, 22 and 23 so that end covers 12 and 13 could be slide fitted over the ends of the folding body portion 11 and yet be retained in place frictionally. If desired, the end covers could also be retained in place by means of straps (not shown) or adhesive (not shown) or gummed paper (not shown) or string or any other means.

The package is assembled as follows: An item such as item 38 is placed on the unfolded portion 11. Portion 11 is then folded around the item so that the protective layer 25 will grasp the item in at least two places when porton 11 is completely folded. Then strap 14 is bound around the folded portion 11 to secure it. Then end covers 12 and 13 are slide fitted into place. The package is now complete except that further fastening means may be employed to secure end covers 12 and 13 in position as set forth above. The package 10 may be conveniently carried by means of the carrying portion 16 of the strap 14. A package 10 is unwrapped by reversing the above procedures, and if care is taken in placing the end covers 12 and 13 on, the package will remain intact in its components and may be used again and again, if desired.

It is, therefore, apparent that we have devised a new type of package which has the inherent characteristics to grasp within itself one or more objects or items of universal size or shape, and to hold one or more of such items within its protective layer 25 without any further means of cushioning or securing such item or items.

While we have described our invention in its preferred form, there are other forms which it may take without departing from the spirit and scope of the invention. For example, we may provide metallic strengthening elements for the corners 40 and 41 in the end covers 12 and 13, or we may provide bevel cuts 42 in the protective layer 25 to run along the score lines at A, B and C to provide for easier folding if desired.

Figure 9:
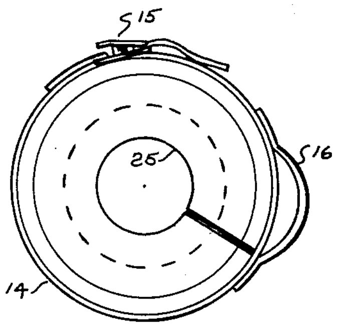
FIG. 9 is a cross section along the lines 9—9 in FIG. 8.
Figure 8:
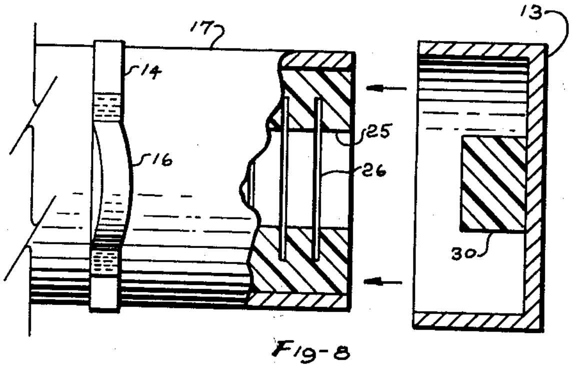
FIG. 8 shows a side elevation of an alternate form of the invention with one end cut away and the other end shown in medial section with cover in slotted position.
Figure 10:
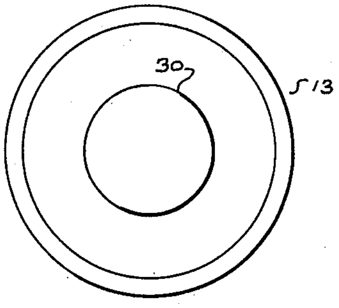
FIG. 10 is an inside plan view of the cover shown in FIG. 8.

In another form of our invention, as shown in FIGS. 8, 9 and 10 of the drawings, we may provide a blank such as the blank 17*a* without scoring or folding means which may be rolled into a cylindrical shape and secured by a strap 14*a*. In this form of the invention, we would provide end portions, such as 13*a*, which are circular instead of square, and which have circular deformable pieces 30*a* attached thereto instead of the square shaped ones. This form of invention could be substituted for the preferred form inasmuch as it would be adapted for use to package items of any size or shape fitting within the area of the package in a manner similar to the preferred form. The deformable layer 25 would be similar, and would have cuts 26 which would grip the material to be packaged in a similar manner to the preferred form of the invention.

In another form of our invention, blanks of indeterminate length could be made on a roll and cut to the desired size to be rolled around or strapped around objects as needed.

We particularly prefer to use polyurethane for our deformable protective layer 25 because of a particular characteristic of the material, namely the fact that polyurethane presents a fine, non-glide, friction surface which is particularly helpful in holding the item to be packaged in place.

We, therefore, desire to be protected for all forms of the invention coming within the scope of the claims hereinbelow.

Wherefore we claim:

1. A flat unfolded carton blank generally rectangular in shape, scored to provide a plurality of panels and having an inner surface and an outer surface with a layer of three dimensional deformable resilient material having dimensions of length, width and thickness secured to the said inner surface of the blank, said layer of deformable resilient material being relatively as wide as the said blank and as long as the said blank, less one thickness of the said layer, in which the said deformable resilient layer has one end contiguous to one end of the said blank, and the other end one of said thicknesses away from the opposite end of said blank, and a plurality of cuts along its surface, said opposite end of said blank forming a pair of shoulders and a flap portion extending therefrom; in combination with at least one end closure and at least one fastening means, in which said end cover is provided with a centrally located block of deformable resilient material adapted to fit into an open end formed when the said flat blank is folded and held in folded position by the said fastening means.

2. The container as defined in claim 1, in which the said deformable resilient material is a foamed plastic.

3. The container as defined in claim 1, in which the said deformable resilient material is foam rubber.

4. The container as defined in claim 1, in which the said deformable resilient material is polyurethane foam.

5. A container comprising at least one folding body portion and a pair of separable end closures in which the said folding body portion comprises a blank of sheet material comprising a pair of surfaces including a relatively thick continuous layer of deformable resilient material of uniform thickness secured to substantially all of one surface thereof, said deformable resilient layer comprising a plurality of cuts on a surface thereof, and at least one folding means; each of said separable end closures comprising a blank formed into an end and walls, in which the said folding body portion may be folded along the said folding means to form a container with sides and open ends, and said separable end closures are adapted to be slide fitted over the said open ends and sides of the folded body portion of the container.

6. The container as defined in claim 5 in which the said end closures are in substantial abutment when they are in position slide fitted on the ends of the folded body portion of the container.

7. The container as defined in claim 5 with the end closures slide fitted in position on the ends of the folded body portion of the container, in combination with adhesive means positioned on at least a portion of each end closure.

8. The container as defined in claim 7 in which the said adhesive means is in the form of adhesive tape positioned at least partially on the said body portion of the container, and touching at least a portion of each of said end closures.

9. The container as defined in claim 5 with the end closures slide fitted in position, being held in place by means of metal fasteners.

References Cited by the Examiner

UNITED STATES PATENTS

| | | | |
|---|---|---|---|
| 1,449,409 | 3/23 | Hunt | 229—14 |
| 1,497,610 | 6/24 | Surmann | 229—23 |
| 2,484,608 | 10/49 | Cheyney | 229—14 |
| 2,785,739 | 3/57 | McGregor | 206—46 |
| 2,860,768 | 11/58 | Smithers | 206—46 |
| 2,979,246 | 4/61 | Liebeskind | 229—14 |
| 3,039,907 | 6/62 | Scholl | 206—46 |

FOREIGN PATENTS

| | | |
|---|---|---|
| 1,225,812 | 7/60 | France. |

GEORGE O. RALSTON, *Primary Examiner.*